United States Patent
Zapotylok et al.

(10) Patent No.: US 11,599,403 B2
(45) Date of Patent: Mar. 7, 2023

(54) LOGGING MECHANISM FOR MEMORY SYSTEM

(71) Applicant: SK hynix Inc., Gyeonggi-do (KR)

(72) Inventors: Alexander Zapotylok, Minsk (BY); Andrei Konan, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 435 days.

(21) Appl. No.: 16/567,440

(22) Filed: Sep. 11, 2019

(65) Prior Publication Data

US 2020/0110652 A1    Apr. 9, 2020

Related U.S. Application Data

(60) Provisional application No. 62/740,772, filed on Oct. 3, 2018.

(51) Int. Cl.
| | |
|---|---|
| *G06F 11/00* | (2006.01) |
| *G06F 11/07* | (2006.01) |
| *G06F 12/02* | (2006.01) |
| *G06F 11/30* | (2006.01) |
| *G06F 13/16* | (2006.01) |

(52) U.S. Cl.
CPC ...... *G06F 11/0775* (2013.01); *G06F 11/0769* (2013.01); *G06F 11/0772* (2013.01); *G06F 11/3037* (2013.01); *G06F 12/0246* (2013.01); *G06F 13/1668* (2013.01)

(58) Field of Classification Search
CPC .......... G06F 11/1048; G06F 2201/835; G06F 11/3065; G06F 11/3476
See application file for complete search history.

(56) References Cited

U.S. PATENT DOCUMENTS

| | | | | |
|---|---|---|---|---|
| 6,477,617 B1* | 11/2002 | Golding | ............ | G06F 3/0619 713/502 |
| 7,039,773 B2* | 5/2006 | Hu | ............ | G06F 16/284 711/158 |
| 7,546,488 B2* | 6/2009 | Walker | ............ | G06F 11/3476 714/38.1 |
| 7,627,614 B2* | 12/2009 | Hu | ............ | G06F 11/1471 707/999.203 |
| 7,774,761 B2* | 8/2010 | Vohra | ............ | G06F 11/3624 717/124 |
| 7,890,299 B2* | 2/2011 | Fok | ............ | H04M 1/72484 702/179 |
| 7,913,030 B2* | 3/2011 | Perry | ............ | G06F 11/349 711/5 |
| 8,037,033 B2* | 10/2011 | Cong | ............ | G06F 3/0611 707/661 |
| 8,095,723 B2* | 1/2012 | Kim | ............ | G06F 12/0246 711/103 |

(Continued)

*Primary Examiner* — Amine Riad
(74) *Attorney, Agent, or Firm* — IP & T Group LLP

(57) ABSTRACT

Techniques to more readily identify issues that arise in connection with memory systems and streamline the analysis process. A detailed activity log is generate with corresponding start and stop traffic events to facilitate identification of problems in memory devices. Each event registered in the log includes numerous items of information. The information facilitates identifying the origin of a particular problem including when and where it occurred, thus making failure analysis (FA) both easier and faster.

18 Claims, 7 Drawing Sheets

(56) References Cited

U.S. PATENT DOCUMENTS

| | | | |
|---|---|---|---|
| 8,171,257 B2* | 5/2012 | Lewis | G06F 16/1815 |
| | | | 711/213 |
| 8,445,338 B2* | 5/2013 | Sekiguchi | H01L 29/78675 |
| | | | 438/154 |
| 8,554,741 B1* | 10/2013 | Malina | G06F 11/1471 |
| | | | 707/674 |
| 8,738,976 B2* | 5/2014 | Nakano | G11C 5/00 |
| | | | 714/763 |
| 8,793,531 B2* | 7/2014 | George | G06F 3/0613 |
| | | | 714/6.3 |
| 8,832,027 B1* | 9/2014 | Bushman | G06F 11/1451 |
| | | | 707/639 |
| 8,990,476 B2* | 3/2015 | Jeddeloh | G06F 1/30 |
| | | | 711/103 |
| 9,015,516 B2* | 4/2015 | Hadley | G06F 13/1642 |
| | | | 710/240 |
| 9,047,922 B2 | 6/2015 | Higley et al. | |
| 9,329,965 B2 | 5/2016 | Hindi et al. | |
| 9,996,563 B2* | 6/2018 | Benke | G06F 16/2365 |
| 2010/0169551 A1* | 7/2010 | Yano | G06F 12/0246 |
| | | | 711/103 |
| 2011/0161566 A1* | 6/2011 | Liang | G06F 12/0246 |
| | | | 711/103 |
| 2014/0372710 A1* | 12/2014 | Bisht | G06F 11/1441 |
| | | | 711/143 |
| 2021/0303213 A1* | 9/2021 | Kato | G06F 3/0659 |

* cited by examiner

LOGGING MECHANISM FOR MEMORY SYSTEM

CROSS-REFERENCE TO RELATED APPLICATION

This application claims the benefit of U.S. Provisional Application No. 62/740,772, filed Oct. 3, 2018, the entire content of which is incorporated herein by reference.

BACKGROUND

1. Field

Embodiments of the present disclosure relate to a logging mechanism for memory systems that enables narrowing the time span in which a particular fail of the system occurred.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes electronics that bridge the flash memory components to the SSD input/output (I/O) interfaces. The SSD controller may include an embedded microprocessor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash memory allows a single machine word (byte) to be written to an erased location or read independently. The NAND-type flash memory operates primarily in memory cards, USB flash drives, SSDs, and similar products, for general storage and transfer of data.

During the lifetime of a memory system, e.g., an SSD, when it is at the customer site, debug information along with abnormal behavior that occurs in the system is typically gathered on an on-going basis. Such information is expected to help narrow down the problem or provide some clues in case of fail. However, when a log is received from the customer, it may be difficult to identify where and when the problem occurred, because the time period covered by the log may be as long as five years (which may be the whole warranty period) and the log itself contains millions of entries.

In this context, embodiments of the present invention arise.

SUMMARY

Embodiments of the present invention are directed to a logging mechanism for memory systems that enables narrowing the time span in which a particular fail occurred to more readily identify when and where the particular fail occurred.

Accordingly, an aspect of present invention includes a method of operating a memory controller to detect activity in a memory device associated with the memory controller. Such method comprises detecting a start traffic event that defines a start of receiving a set of commands from a host; registering the start traffic event in an activity log; detecting, after the start traffic event, a specific period of time in which no commands are received; and registering in the activity log a stop traffic event after the specific period of time elapses.

Another aspect of the present invention is directed to a memory system that comprises a memory device; and a memory controller configured to detect activity in the memory device associated with the memory controller. The memory controller includes a logger configured to detect a start traffic event that defines a start of receiving a set of commands from a host; register the start traffic event in an activity log; detect, after the start traffic event, a specific period of time in which no commands are received; and register in the activity log a stop traffic event after the specific period of time elapses.

In another aspect of the present invention, a method of operating a memory controller detects activity in a memory device associated with the memory controller. Such method comprises detecting multiple start traffic events, each of which defines a start of receiving a corresponding set of commands from a host; registering each of the multiple start traffic events in an activity log; detecting, after each start traffic event, a specific period of time in which no commands are received; and registering in the activity log multiple stop traffic events, each being registered after the corresponding specific period of time elapses.

Additional aspects of the present invention will become apparent from the following description.

DETAILED DESCRIPTION

Figure 1:
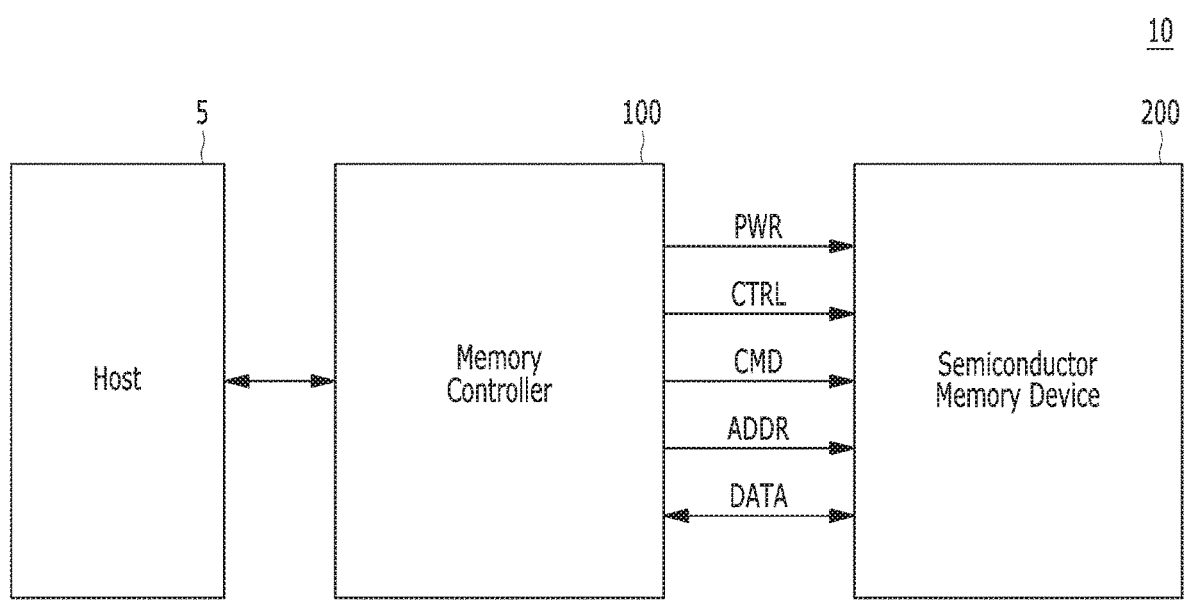
FIG. 1 is a diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. The semiconductor memory device(s) 200 are preferably flash memory device(s), particularly of the NAND-type.

The memory controller 100 may control overall operations of the semiconductor memory device 200. For simplicity, the memory controller 100 and semiconductor memory device 200 may sometimes be referred to below simply as controller 100 and memory device 200, respectively.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device 5 coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
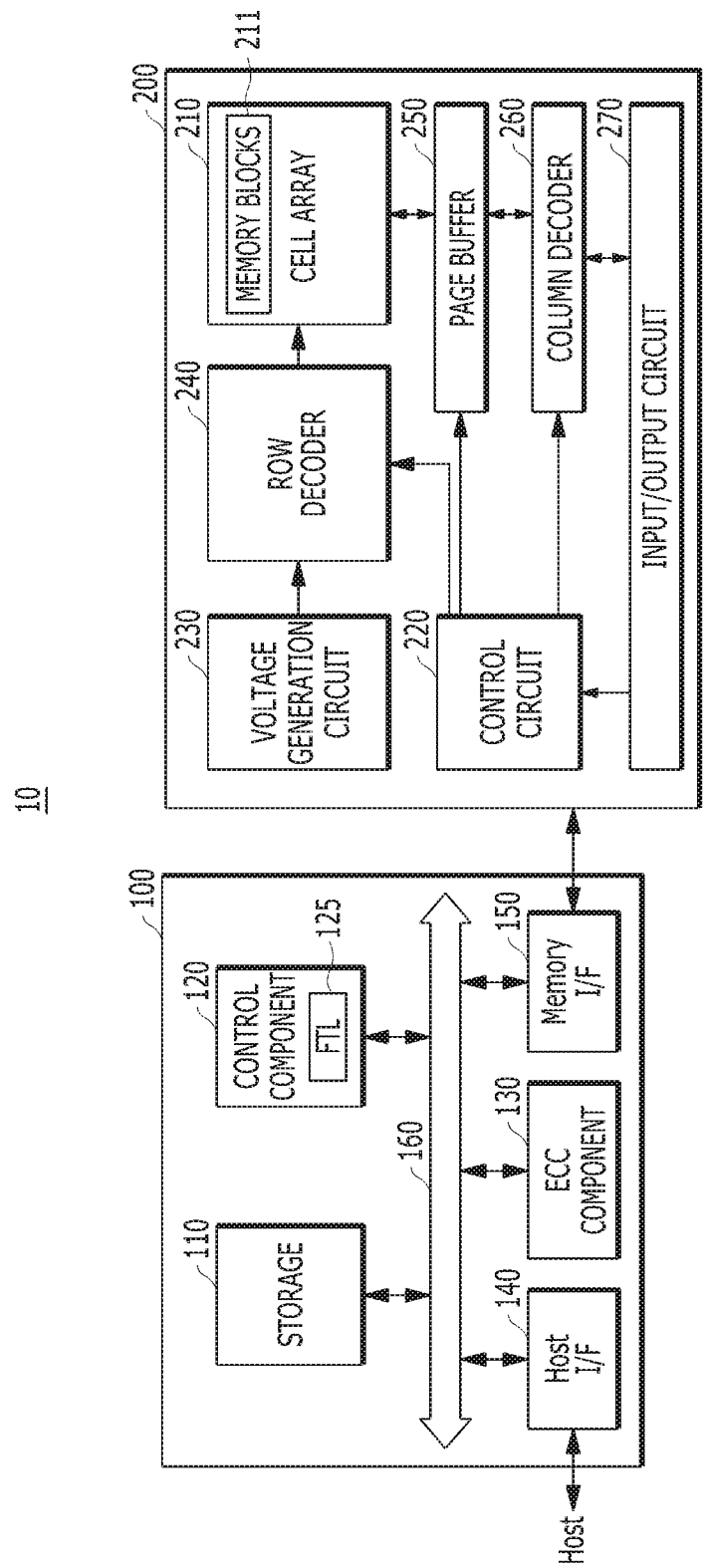
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device 5, and in particular, store data to be accessed by the host device 5.

The host device 5 may be implemented with any one of various kinds of electronic devices. In some embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device 5 may include a portable electronic device such as a mobile phone, a smart phone, an e-book, an MP3 player, a portable multimedia player (PMP), and/or a portable game player.

The memory device 200 may store data to be accessed by the host device 5.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device 5. The controller 100 may provide data read from the memory device 200 to the host device, and may store data provided from the host device 5 into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device 5 in the memory device 200 for the read and write operations. To store the data, the storage 110 may include a program memory, a data memory, a write buffer, a read buffer, a map buffer, and the like. The storage 110 may include a hash table 115.

The control component 120 may control general operations of the memory system 10, and a write operation or a read operation for the memory device 200, in response to a write request or a read request from the host device 5. The control component 120 may drive firmware, referred to as a flash translation layer (FTL) 125, to control general operations of the memory system 10. For example, the FTL 125 may perform operations such as logical-to-physical (L2P) mapping, wear leveling, garbage collection (GC), and/or bad block handling. The FTL 125 may be implemented, as firmware, in the controller 100, and more specifically, in the control component 120. The L2P mapping is known as logical block addressing.

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). The ECC component 130 may include any and all circuits, systems or devices for suitable error correction operation.

The host interface 140 may communicate with the host device 5 through one or more of various interface protocols, such as a universal serial bus (USB), a multi-media card (MMC), peripheral component interconnect express (PCI-e or PCIe), a small computer system interface (SCSI), a serial-attached SCSI (SAS), a serial advanced technology attachment (SATA), a parallel advanced technology attachment (PATA), non-volatile memory express (NVMe), an enhanced small disk interface (ESDI), and integrated drive electronics (IDE).

The memory interface 150 may provide an interface between the controller 100 and the memory device 200 to allow the controller 100 to control the memory device 200 in response to a request from the host device 5. The memory interface 150 may generate control signals for the memory device 200 and process data under the control of the control component (or CPU) 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer (array) 250, which may be in the form of an array of page buffers, a column decoder 260, and an input/output circuit 270. The memory cell array 210 may include a plurality of memory blocks 211 which may store data. Subsets of the memory blocks may be grouped into respective super blocks for certain operations.

The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
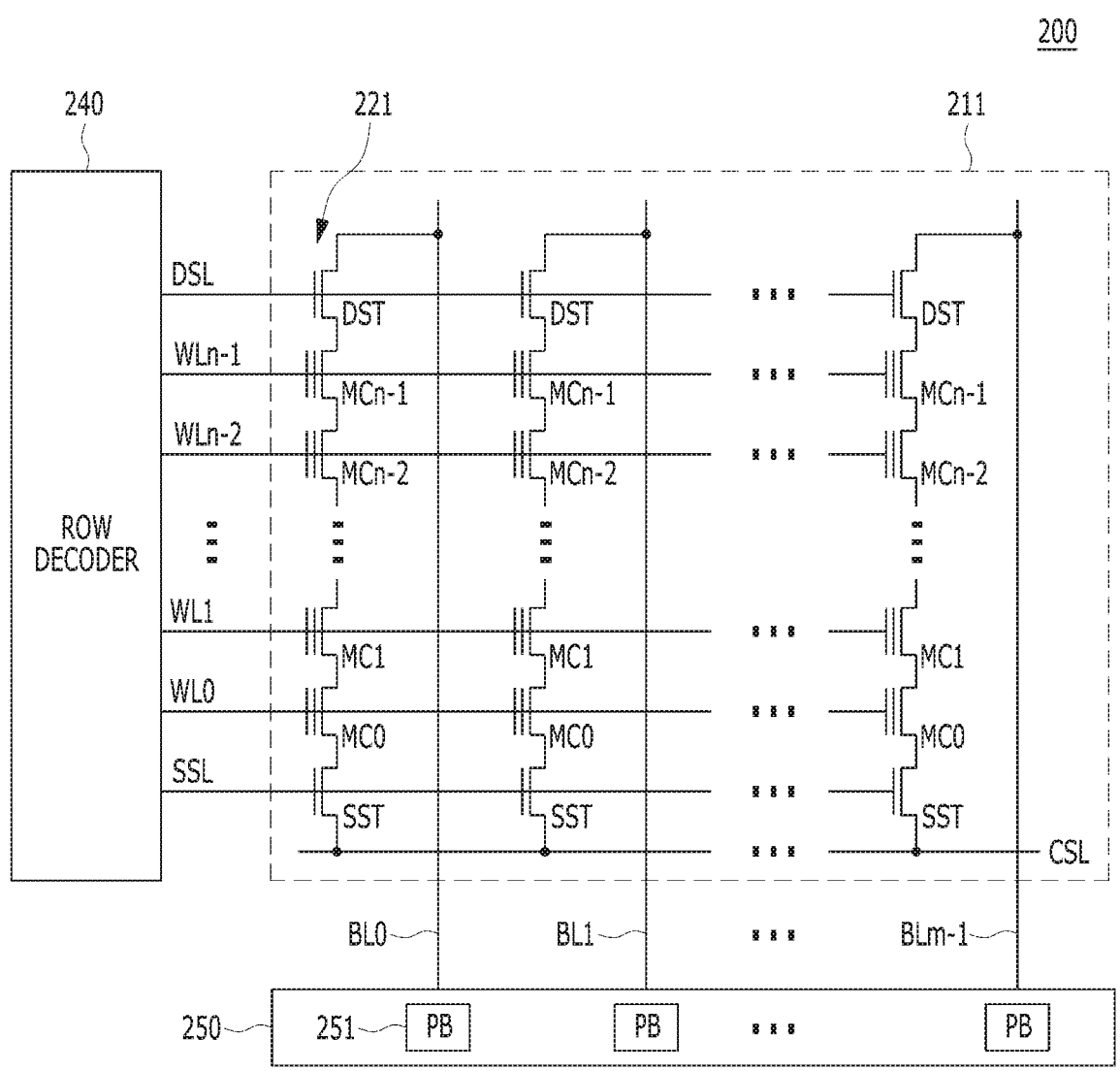
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer (array) 250 may be in the form of a page buffer array including a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As previously noted, over the course of its lifetime, a memory system experiences various issues, some of which require some level of analysis. While information on these issues is gathered and logged on an on-going basis, because there are so many entries spanning a relatively long period of time, it is difficult to find information relevant to a particular issue, e.g., a fail.

Embodiments of the present invention provide an improved logging mechanism, e.g., a logger, and method of detecting and logging activity in a memory system, which improve the situation described above by facilitating locating information relevant to a particular issue of interest.

Figure 4:
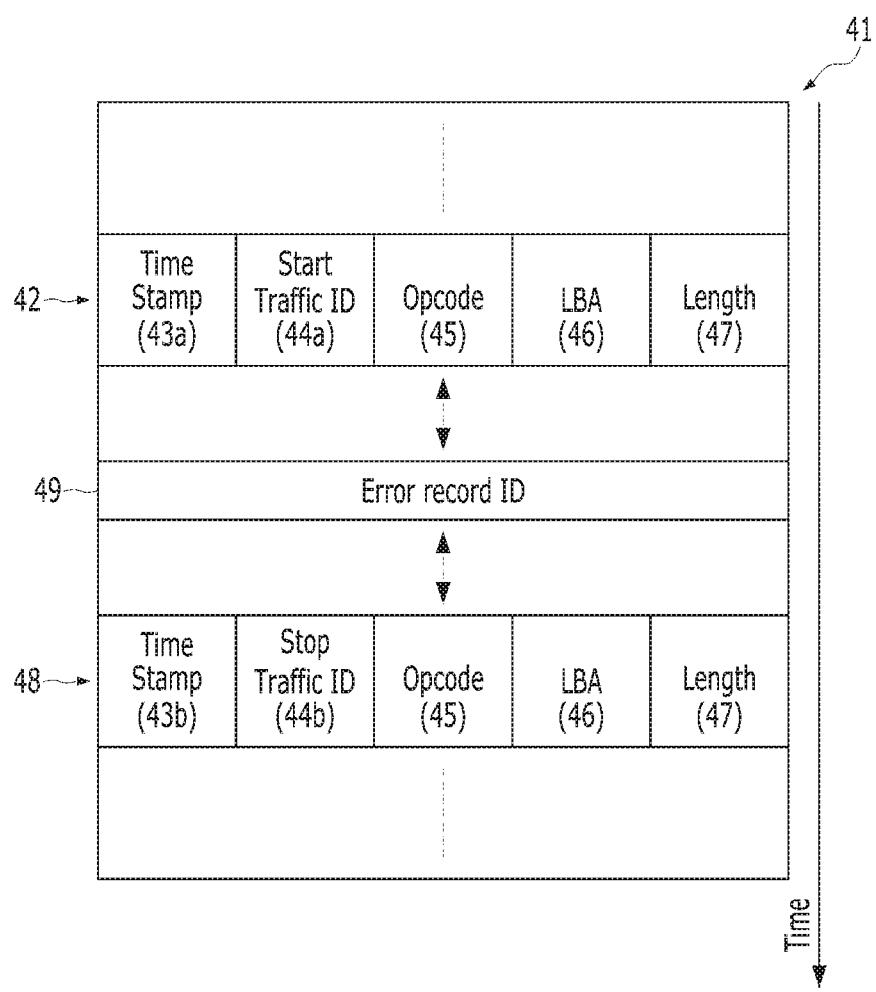
FIG. 4 is a diagram illustrating a layout of a logger or log in accordance with an embodiment of the present invention.

Referring to FIG. 4, a layout of a logger (or log) 41 in accordance with an embodiment of the present invention is illustrated. The logger 41 contains data that can be saved or flushed to the memory device 200, e.g., to NAND. In the logger 41, start traffic and stop traffic events are registered for read, write, and other commands received from the host 5. For each event, there is one record for the start and one record for the end, and each record has a time stamp.

More specifically, a given start traffic event 42 includes the following information: a time stamp 43a indicating the time at which the start traffic event is registered, a start traffic identification (ID) 44a identifying the start traffic event, operation code (Opcode) 45 specifying an operation performed by the set of commands associated with the start traffic event, a logical block address (LBA) 46 identifying a location in the memory device 200 where the operation is performed, and a length (Length) 47 of the set of commands, which may represent the number of sectors of the commands.

For each start traffic event there is a corresponding stop traffic event. In FIG. 4, stop traffic event 48 corresponds to the start traffic event 42 described above. The stop traffic event 48 includes a time stamp 43b Indicating the time at which the stop traffic event is registered, a stop traffic ID 44a identifying the stop traffic event. The stop traffic event also includes the following information common with the corresponding start traffic event: the operation code (Opcode) 45, the LBA 46, and the length (Length) 47 of the set of commands.

In operation, the host device 5 sends a set of commands, and at some point, it stops sending commands. Typically, there is a period of time during which no commands are sent. This lull period is used to register a stop traffic event for the set of commands just sent. For example, once the last command of the set is fetched by the firmware of the memory controller 100, the stop traffic event 48 may be registered. In registering the stop traffic event 48, all of its associated information described above is also registered.

In an embodiment, the commands associated with a particular start and stop traffic event pair may be of the same type, i.e., read commands, write commands, or other type of commands fetched by the firmware. Separate timers may be used, or individual time periods may be set, for the different types of commands.

Figure 5A:
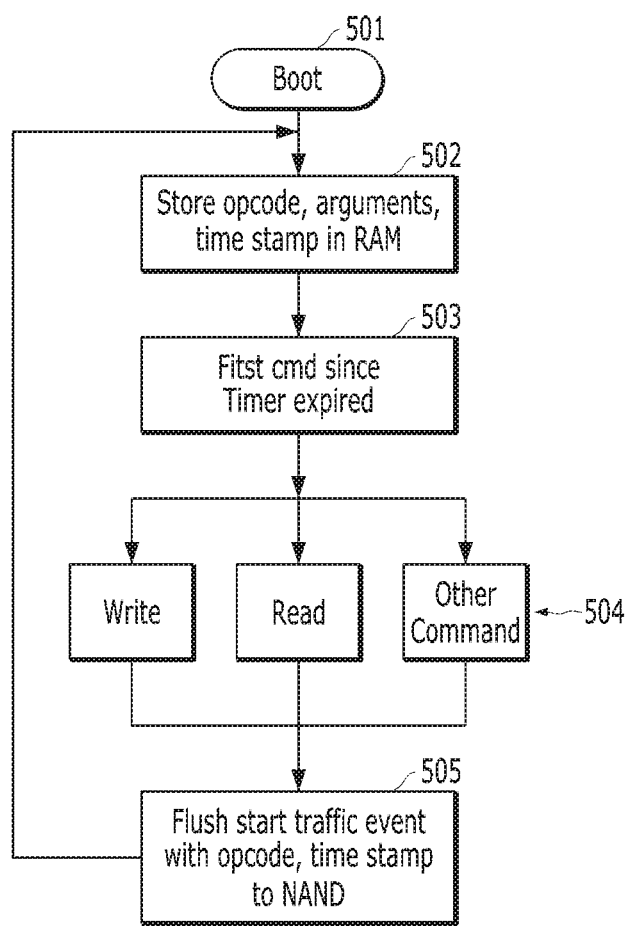
FIGS. 5A and 5B are flow charts illustrating the flow of host activity lifetime logging in accordance with an embodiment of the present invention.

As shown in the flow chart of FIG. 5A, after device boot or the previous stop traffic event (step 501), a start traffic event is recorded for the first command at step 502. That is, corresponding Opcode, arguments, time stamp, etc. are stored in RAM, e.g., storage 110. Then, the type of the first command following expiration of a specific or set period of time is determined at step 503. The set period of time may be maintained by a timer, e.g., ISR (interrupt service routine) timer, which may be embodied in the controller 100. The type of command refers to whether the command is a write command, read command, or other command, as indicated at step 504. Then, the recorded start traffic event is flushed to NAND, e.g., memory device 200, at step 505.

Figure 5B:
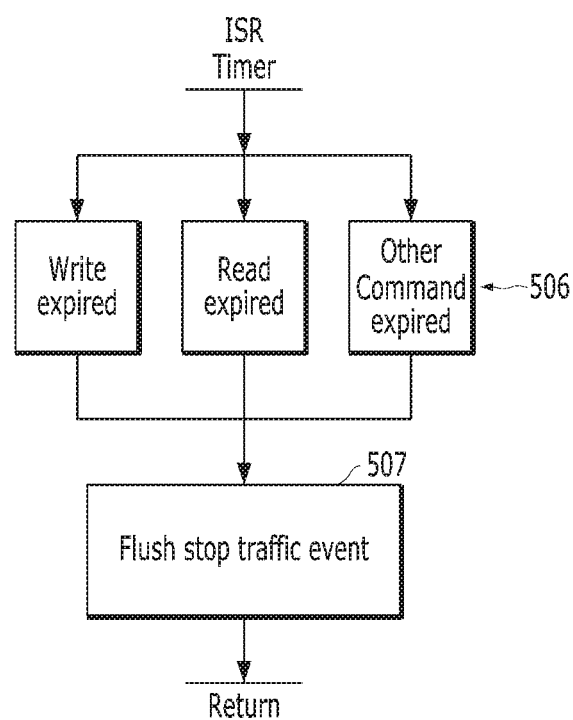

Referring to the flow chart of FIG. 5B, the ISR timer operates to measure a set period of time after the last command. As indicated at step 506, each type of command may have its own set period of time. After the time set for the particular type of command, the stop traffic event is detected and recorded. In general, the set period of time may be about 10 minutes. Thereafter, at step 507, the recorded stop traffic event is flushed to NAND.

While it is not known where exactly the problem occurred during this long period, but various commands sent by the customer may be obtained. Such commands include test log, Windows activity, etc. The point is to make a connection between the connection between host activity and drive activity. For example, an event is sent from the memory system, and host activity is introduced. Therefore, the intersection on the timeline, i.e., to find a small section in a log with millions of entries, where the fail is located can be found.

Figure 6:
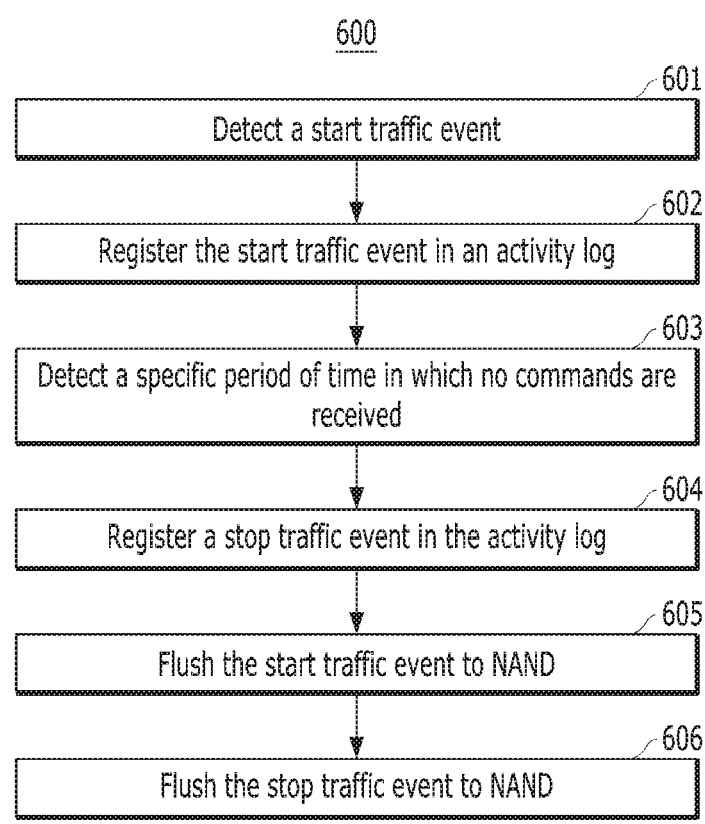
FIG. 6 is a flow chart illustrating processes of detecting activity in a memory device of a memory system in accordance with embodiments of the present invention.

FIG. 6 is a flow chart 600 describing steps in processes of detecting activity in a memory device of a memory system, in accordance with embodiments of the present invention. The steps shown in flow chart 600 are exemplary. Those skilled in the art will understand that additional and/or alternative steps may be performed, or that the order of steps may be changed, to effectuate aspects of the present invention without departing from the inventive concepts disclosed herein.

At step 601, a start traffic event that defines a start of receiving a set of commands from a host is detected. The start traffic event is registered in an activity log at step 602. After the start traffic event, at step 603, a specific period of time in which no commands are received is detected. After specific period of time elapses, at step 604, a stop traffic event is registered in the activity log. The start and stop traffic events are then flushed to NAND at appropriate times as indicated in steps 605 and 606.

This process continues to create a detailed activity log of events that can be used to identify and solve issues or problems that arise in the operation of the memory system.

As the foregoing demonstrates, embodiments of the present invention provide mechanisms to identify problems in memory devices more quickly. The mechanisms provided herein facilitate identifying the origin of a particular problem including when and where it occurred, which is often difficult even using tracers and analyzers Thus, embodiments of the present invention simplify these investigations and make failure analysis (FA) both easier and faster.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method of operating a memory controller to detect activity in a memory device associated with the memory controller, the method comprising:
   detecting a start traffic event that defines a start of receiving a set of commands at the memory device from a host, wherein a host interface connects the host to the memory device;
   registering the start traffic event in an activity log;
   detecting, after the start traffic event, a specific period of lull time, after a last command of the set of commands is fetched by the memory controller, in which no commands were received from the host; and
   registering in the activity log a stop traffic event after the specific period of lull time elapses in which no commands were received from the host,
   wherein the specific period of the lull time elapsed exceeds a time set for the last command.

2. The method of claim 1, wherein the registering of the start traffic event includes registering a time stamp specifying a time at which the start traffic event is registered, a start traffic identification, operation code specifying an operation performed by the set of commands, a logical block address (LBA) identifying a location in the memory device where the operation is performed, and a length of the set of commands.

3. The method of claim 2, wherein the registering of the stop traffic event includes registering a time stamp specifying a time at which the stop traffic event is registered, a stop traffic identification, the operation code specifying the operation performed by the set of commands, the logical block address (LBA) identifying the location in the memory device where the operation is performed, and the length of the set of commands.

4. The method of claim 1, wherein the set of commands are all of specific type.

5. The method of claim 4, wherein the specific type is read or write.

6. The method of claim 1, wherein the detecting of the start traffic event is based on elapse of the specific period of time since receiving from the host a last command of an immediately previous set of commands.

7. The method of claim 1, further comprising:
   storing the start traffic event in the memory device after registering the start traffic event.

8. The method of claim 1, further comprising:
   storing the stop traffic event in the memory device after registering the stop traffic event.

9. The method of claim 1, wherein there is one record for the start traffic event with a start traffic time stamp and there is a corresponding record for the stop traffic event with a stop traffic time stamp.

10. A memory system comprising:
    a memory device; and
    a memory controller configured to detect activity in the memory device associated with the memory controller, the memory controller including a logger configured to:
    detect a start traffic event that defines a start of receiving a set of commands at the memory device from a host, wherein a host interface connects the host to the memory device;
    register the start traffic event in an activity log;
    detect, after the start traffic event, a specific period of lull time, after a last command of the set of commands is fetched by the memory controller, in which no commands were received from the host; and
    register in the activity log a stop traffic event after the specific period of lull time elapses in which no commands were received from the host,
    wherein the specific period of the lull time elapsed exceeds a time set for the last command.

11. The memory system of claim 10, wherein the memory controller comprises a timer to count down the specific period of time.

12. The memory system of claim 11, wherein the controller comprises different timers for different types of commands.

13. The memory system of claim 10, wherein each of the start traffic event and the stop traffic event includes a corresponding time stamp and traffic identification.

14. The memory system of claim 10, wherein there is one record for the start traffic event with a start traffic time stamp and there is a corresponding record for the stop traffic event with a stop traffic time stamp.

15. A method of operating a memory controller to detect activity in a memory device associated with the memory controller, the method comprising:
    detecting multiple start traffic events, each of which defines a start of receiving a corresponding set of commands at the memory device from a host, wherein a host interface connects the host to the memory device;
    registering each of the multiple start traffic events in an activity log;

detecting, after each start traffic event, a specific period of lull time, after a last command of the set of commands is fetched by the memory controller, in which no commands were received from the host; and registering in the activity log multiple stop traffic events, each being registered after the corresponding specific period of lull time elapses in which no commands were received from the host, wherein the specific period of the lull time elapsed exceeds a time set for the last command.

16. The method of claim 15, further comprising:

flushing each of the registered start traffic events to the memory device.

17. The method of claim 15, further comprising:

flushing each of the registered stop traffic events to the memory device.

18. The method of claim 15, wherein there is one record for the start traffic event with a start traffic time stamp and there is a corresponding record for the stop traffic event with a stop traffic time stamp.

* * * * *